(12) United States Patent
Taga

(10) Patent No.: US 8,758,919 B2
(45) Date of Patent: Jun. 24, 2014

(54) COMPACT STORAGE OF SIGNAL LINES IN A BATTERY PACK

(75) Inventor: Hideyuki Taga, Anjo (JP)

(73) Assignee: Makita Corporation, Anjo-shi (JP)

( * ) Notice: Subject to any disclaimer, the term of this patent is extended or adjusted under 35 U.S.C. 154(b) by 813 days.

(21) Appl. No.: 12/453,882

(22) Filed: May 26, 2009

(65) Prior Publication Data

US 2009/0297928 A1    Dec. 3, 2009

(30) Foreign Application Priority Data

May 29, 2008    (JP) ................ 2008-140715

(51) Int. Cl.
*H01M 2/10*    (2006.01)
(52) U.S. Cl.
USPC ............... 429/96; 429/91; 429/99; 429/100; 429/120; 429/143; 429/148; 429/159; 429/163
(58) Field of Classification Search
CPC ........... H01M 10/5004; H01M 2/105; H01M 2004/024; H01M 2/1022
USPC ........... 429/99, 100, 120, 143, 148, 159, 163, 429/91, 96
See application file for complete search history.

(56) References Cited

U.S. PATENT DOCUMENTS

| | | | |
|---|---|---|---|
| 5,422,784 A * | 6/1995 | Wakahara et al. | 361/679.08 |
| 6,152,597 A | 11/2000 | Potega | |
| 6,972,544 B2 * | 12/2005 | Seman et al. | 320/112 |
| 7,059,769 B1 * | 6/2006 | Potega | 374/185 |
| 2002/0149346 A1 | 10/2002 | Sakakibara | |
| 2005/0110458 A1 | 5/2005 | Seman, Jr. et al. | |

FOREIGN PATENT DOCUMENTS

| | | |
|---|---|---|
| JP | U-1-866261 | 6/1989 |
| JP | A-07-235287 | 9/1995 |
| JP | A-08-203568 | 8/1996 |
| JP | A-H08-213722 | 8/1996 |
| JP | A-11-067172 | 3/1999 |
| JP | 11-314428 | * 11/1999 |
| JP | A-2000-208118 | 7/2000 |
| JP | A-2001-36246 | 2/2001 |
| JP | A-2001-229883 | 8/2001 |
| JP | A-2002-124306 | 4/2002 |
| JP | A-2003-45409 | 2/2003 |
| JP | A-2003-142051 | 5/2003 |
| JP | A-2005-150079 | 6/2005 |
| JP | A-2005-317368 | 11/2005 |
| JP | A-2007-508681 | 4/2007 |
| JP | A-2008-060114 | 3/2008 |
| KR | 10-0809575 | 3/2008 |
| RU | 2 054 783 C1 | 2/1996 |
| WO | WO 2005/057497 | 6/2005 |
| WO | WO 2006/057497 A1 | 6/2006 |

OTHER PUBLICATIONS

JP 11-314428 Abstract.*

(Continued)

*Primary Examiner* — Patrick Ryan
*Assistant Examiner* — Alex Usyatinsky
(74) *Attorney, Agent, or Firm* — Oliff PLC

(57) ABSTRACT

One aspect according to the present invention includes a battery pack having a device for electrically connecting between batteries and an electric circuit of the battery pack. The device includes a plural number of signal lines formed on or within a flexible base plate.

7 Claims, 5 Drawing Sheets

(56) References Cited

OTHER PUBLICATIONS

European Search Report Issued in European Application No. 09007094.7 on Nov. 16, 2009.
Feb. 12, 2013 Office Action issued in Japanese Patent Application No. 2008-140715 (with translation).
Nov. 6, 2012 Office Action issue in Japanese Application No. 2008-140715 (with translation).
Apr. 16, 2013 Office Action issued in Japanese Patent Application No. 2008-140715 (with translation).
Office Action issued in Russian Patent Application No. 2009120368/07 (with translation).
Apr. 30, 2013 Office Action issued in Russian Patent Application No. 2009120368/09 (with translation).

* cited by examiner

COMPACT STORAGE OF SIGNAL LINES IN A BATTERY PACK

This application claims priority to Japanese patent application serial number 2008-140715, the contents of which are incorporated herein by reference.

BACKGROUND OF THE INVENTION

1. Field of the Invention

The present invention relates to battery packs for power tools and also relates to devices for electrically connecting between batteries and electric circuits of battery packs.

2. Description of the Related Art

A known battery pack includes a case main body with an upper opening, a cover portion for closing the upper opening of the case main body, a plural number of rechargeable batteries stored in the case main body, charge and discharge electric terminals for connecting to a power tool or a battery charger, a control unit for monitoring charge and discharge conditions, and signal lines transmitting the signals from the rechargeable batteries to the control unit. Japanese Laid-Open Patent Publication No. 2002-124306 discloses a technique relating to a battery pack of a type described above. In this publication, the battery pack includes a control unit for monitoring charge and discharge conditions of rechargeable batteries based on voltage signals transmitted from rechargeable batteries. Lead wires are used as signal lines for transmitting the voltage signals of the rechargeable batteries to the control unit.

In order to transmit voltage signals of the plural number of rechargeable batteries to the control unit, a plural number of voluminous lead wires are necessary and thus, a large space is required for wiring. Due to this, the size of the battery pack has become larger.

Therefore, there is a need in the art for preventing enlargement of size of a battery pack by compactly storing a plural number of signal lines in the battery pack.

SUMMARY OF THE INVENTION

One aspect according to the present invention includes a battery pack having a device for electrically connecting between batteries and an electric circuit of the battery pack. The device includes a plural number of signal lines formed on or within a flexible base plate.

DETAILED DESCRIPTION OF THE INVENTION

Figure 1:
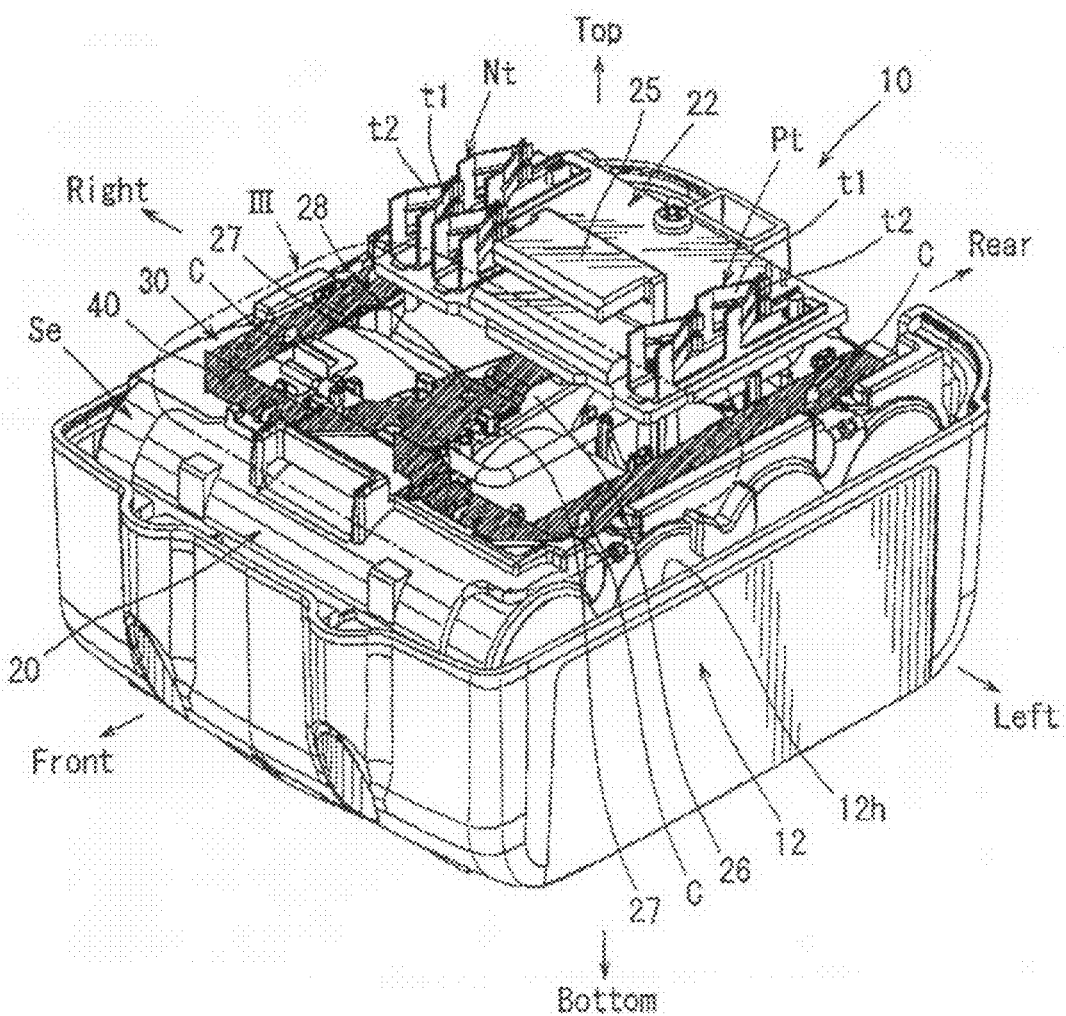
FIG. 1 is a perspective view showing a battery pack according to an embodiment of the present invention with a cover removed from an upper opening of a case main body of the battery pack.

Each of the additional features and teachings disclosed above and below may be utilized separately or in conjunction with other features and teachings to provide improved battery packs. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a battery pack for a power tool includes a case main body configured to have an upper opening, a cover capable of closing the upper opening of the case main body, a plural number of rechargeable batteries stored inside the case main body, charge and discharge terminals capable of connecting the rechargeable batteries to a power tool or a battery charger, a control unit capable of monitoring charge and discharge states of the rechargeable batteries based on signals transmitted from the rechargeable batteries, and a plural number of signal lines capable of transmitting the signals from the rechargeable batteries to the control unit. The plural number of signal lines are formed on or within a single band-like flexible base plate.

Therefore, the space required for wiring can be narrowed compared to individually wiring a plural number of electrically conductive lead wires. Accordingly, it is possible to reduce the size of the battery pack.

The flexible base plate can be bent by an angle of about 180 degrees. Accordingly, the freedom of positioning of the flexible base plate is increased and the flexible base plate can be stored utilizing open space of the case main body. Accordingly, the freedom of positioning of the flexible base plate is increased and the flexible base plate can be stored utilizing open space of the case main body.

The flexible base plate may include a first band plate portion, a second band plate portion and a base portion connected to base end portions of the first and second band plate portions. The first band plate portion is bent at a right angle in plan view relative to the base portion and the first band plate portion is further bent to have a substantially L-shape in plan view, so that a leading end portion of the first band plate portion is held to be arranged parallel to the base portion. The second band plate portion is bent in a direction opposite to the first band plate portion and the second band plate portion is further bent to have substantially L-shape in plan view, so that a leading end portion of the second plate portion is held to be arranged parallel to the base portion.

Specifically, because the band-like flexible base plate can be bent have a substantially E-shape in plan view, the manufacturing cost can be reduced compared to molding a base plate to have a substantially L-shape by using a mold or the like.

The flexible base plate may be positioned on an internal case covering upper surfaces of the rechargeable batteries and can be viewed when the cover is opened. Therefore, the mounting operation of the flexible base plate and the connecting operation of the signal line can be easily performed.

A flat surface for placing the flexible base plate may be formed on the internal case. A positioning protrusion may be formed on the flat surface. At least a pair of restraining protrusions may be formed on the both sides with respect to a widthwise direction of the flat surface. Each of the restraining protrusions includes a vertical wall portion and a holding portion. The vertical wall portion can restrain the flexible base plate from the widthwise direction. The holding portion extends from the side surface of the vertical wall towards the inner side with respect to the widthwise direction of the flat surface and restraining a part of an end edge of the flexible base plate from an upper side. The flexible base plate may include cut portions and a through-hole, the cut portions being positioned on both end edges of the flexible base plate so as to be capable of being aligned with the holding portions of the restraining protrusions. The through-hole is capable of engaging the positioning protrusion of the flat surface. The through-hole and the positioning protrusion can engage with each other by positioning the cut portions of the flexible base plate to align with the holding portions of the restraining projections, placing the flexible base plate on the flat surface, and sliding the flexible base plate in a predetermined direction to cause the end edge of the flexible base plate to be restrained by the restraining protrusions from the upper side.

Therefore, displacement of the flexible substrate and also removal (floating) of the flexible base plate from the flat surface can be prevented. Further, by sliding the flexible base plate and positioning the cut portions of the flexible base plate to align with the holding portions of the restraining protrusions, the flexible base plate can be easily removed from the flat surface.

An embodiment of the present invention will be explained with reference to FIG. 1-FIG. 5. A battery pack of the embodiment is used for power tools, such as a screwdriver and a drill, and is rechargeable with a battery charger. In the drawings, the indications "front," "rear," "right," "left," "top," and "bottom" correspond to front, rear, left, right, top, and bottom of the battery pack.

<General Construction of the Battery Pack>

Figure 2:
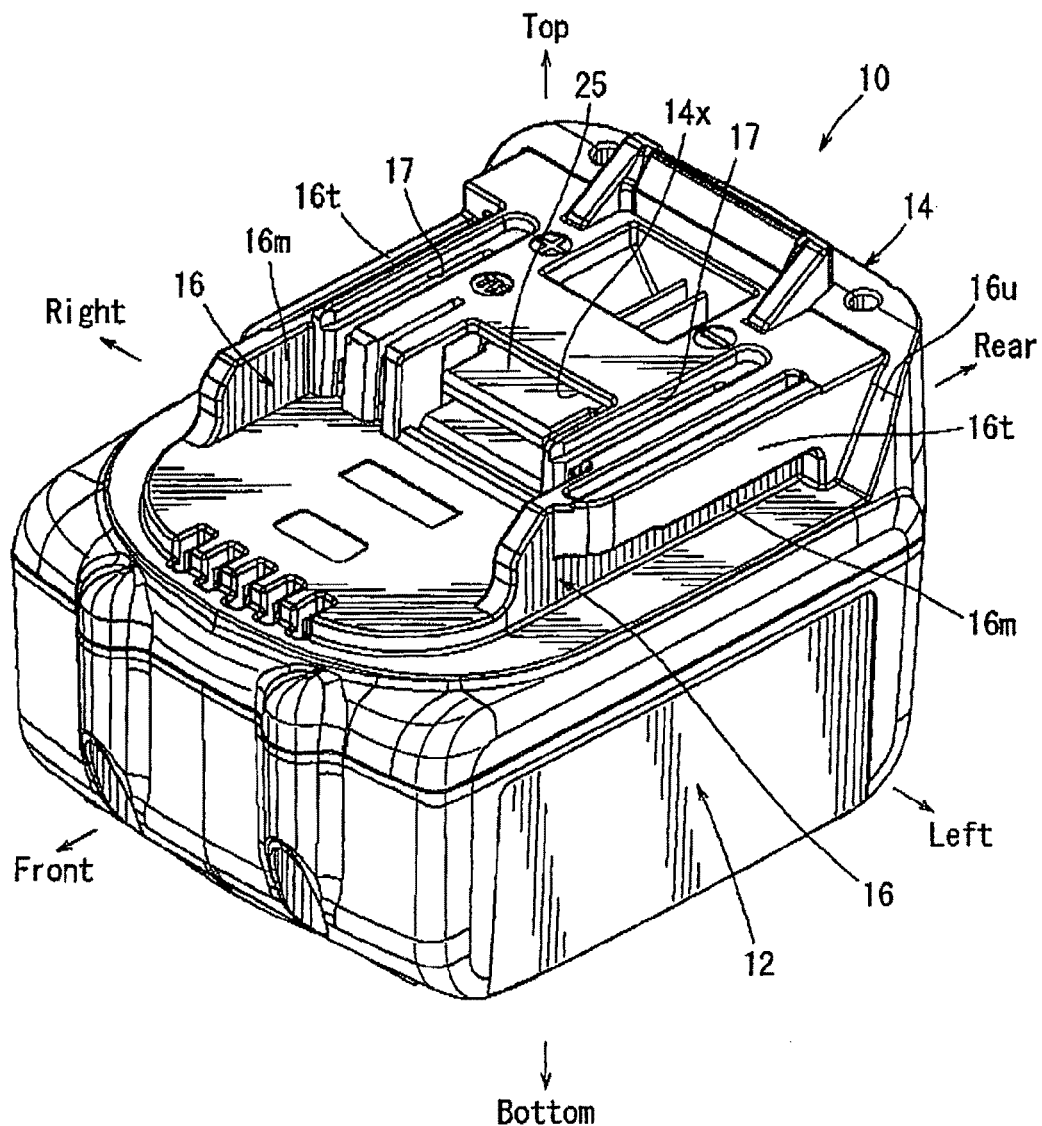
FIG. 2 is an overall perspective view of the battery pack.

As shown in FIGS. 1 and 2, the battery pack 10 according to this embodiment has a case main body 12 with an upper opening 12*h* and a cover portion 14 for closing the upper opening 12*h* of the case main body 12. The case main body 12 and the cover 14 are formed to have a substantially rectangular shape in plan view. The cover 14 may be fastened to the case main body 12 with screws at four periphery points of the cover 14.

Figure 4:
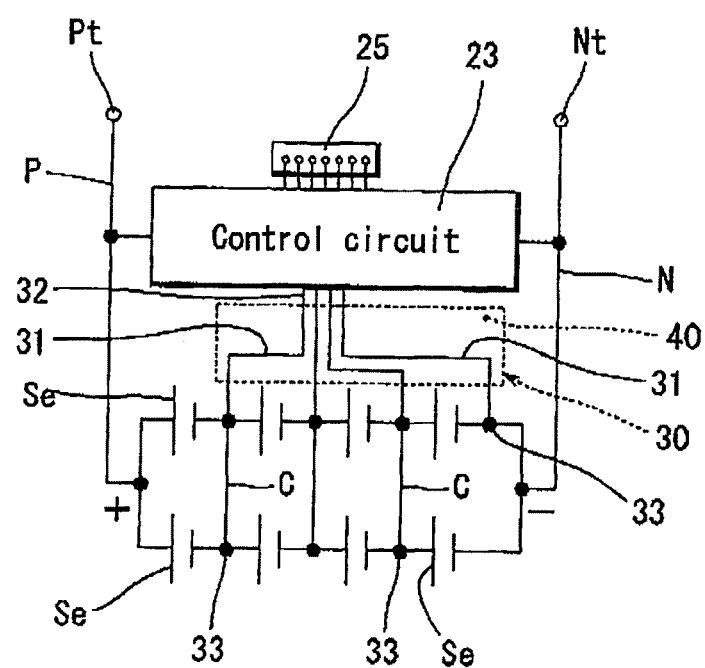
FIG. 4 is a schematic circuit configuration of the battery pack.

The case main body 12 stores eight rechargeable batteries Se each having a cylindrical shape. Specifically, the eight rechargeable batteries divided into two sets of four rechargeable batteries stacked vertically and stored in the case main body 12. As shown in FIG. 4, each two rechargeable batteries are connected parallelly and four sets of the two rechargeable batteries Se are connected in series. The positive side of an assembly of the eight rechargeable batteries Se (+ side in FIG. 4) is connected to a positive side charge and discharge terminal Pt via a positive side conductor P. The minus side of the assembly of the rechargeable batteries Se (− side in FIG. 4) is connected to a negative side charge and discharge terminal Nt via a negative side conductor N. The positive and negative side charge and discharge terminals Pt and Nt are configured to be respectively connectable to positive and negative side plate-like terminals of the power tool (not shown).

As shown in FIG. 1, the eight rechargeable batteries Se are stored in the case main body 12 while their outer peripheral surfaces are covered by an internal case 20. A rectangular electric circuit board 22 is disposed on a rear part of the upper surface of the internal case 20 covering the four rechargeable batteries stacked on the upper side. A control circuit 23 for monitoring charge and discharge conditions of the rechargeable batteries Se (See FIG. 4, not shown in FIG. 1) are formed on the central part of an upper surface of the electric circuit board 22. As shown in FIG. 1, the charge and discharge terminals Pt and Nt are mounted to right and left ends of the upper surface of the electric circuit board 22. Each of the charge and discharge terminals Pt and Nt has a pair of right and left leaf spring-like terminal portions t1 and t2. The end portions of the leaf spring-like terminal portions t1 and t2 contact each other by resiliency. The electric charger or the plate-like terminals of the power tool is pushed from the front side in between the right and left leaf spring-like terminal portions t1 and t2 of the charge and discharge terminals Pt an Nt. In this way, the plate-like terminals and the charge and discharge terminals Pt and Nt may be electrically connected.

On the upper surface of the electric circuit board 22, an output connector 25 of the control circuit 23 is attached in between the positive side and negative side charge and discharge electric terminals Pt and Nt. The output connector 25 is formed to be oriented toward the front side, so that a connector of the electric charger or the power tool can be connected to the output connector 25 from the front side.

As shown in FIG. 2, slide rails 16 are formed on both the right and the left sides on the cover 14 of the battery pack 10 so that the slide rails 16 extend in forward and rearward directions. Each of the right and the left slide rails 16 has a rail main body 16*m* and a protrusion 16*t* protruding by a predetermined distance from an upper side surface of the rail main body 16*m* outwardly in a widthwise direction. A stopper 16*u* is formed on the rear end of the rail main body 16*m*.

Connecting portions (not shown) formed on the electric charger or the power tool can engage with the right and the left slide rails 16 of the cover 14 from the font side. While being engaged, the connecting portions may be further slid rearwardly along the slide rails 16 until contacting with the stopper portions 16*u*.

Guide slits 17 are formed on the inner side with respect to the width direction of the right and the left slide rails 16. The guide slits 17 serve to guide the plate-like terminals of the battery charger or the power tool to reach the positive and negative side charge and discharge terminals Pt and Nt. At a position between the guide slits 17, an opening 14*x* for exposing the output connector 25 of the control circuit 23 is formed.

According to the above construction, the connecting portions of the battery charger or the power tool are engaged with the slide rails 16 of the cover 14 from the front side. While being engaged, the connecting portions may further slide rearwardly until contacting with the stopper portions 16*u*. In this way, the plate terminals and the connector of the battery charger or the power tool can be respectively connected to the charge and discharge terminals Pt and Nt and the output connector 25 of the battery pack 10.

<Flexible Base Plate>

As shown in FIG. 1, a flexible based plate 30 is attached to the upper surface of the internal case 20 stored in the case main body 12 of the battery pack 10. As shown in FIG. 4, the flexible base plate 30 is a film like member for transmitting voltage signals of the rechargeable batteries Se to the control circuit 23 of the electric circuit board 22. The flexible base plate 30 includes a plural number of electrically conductive lines or signal lines 31 and a base plate main body 40 made of electrical insulation material and having signal lines 31 embedded therein.

Figure 5A:
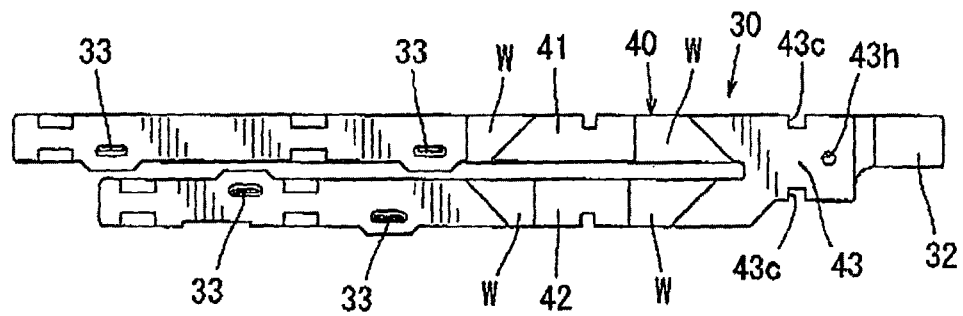
FIGS. 5(A) and 5(B) are views showing steps of manufacturing the flexible substrate.
Figure 5B:
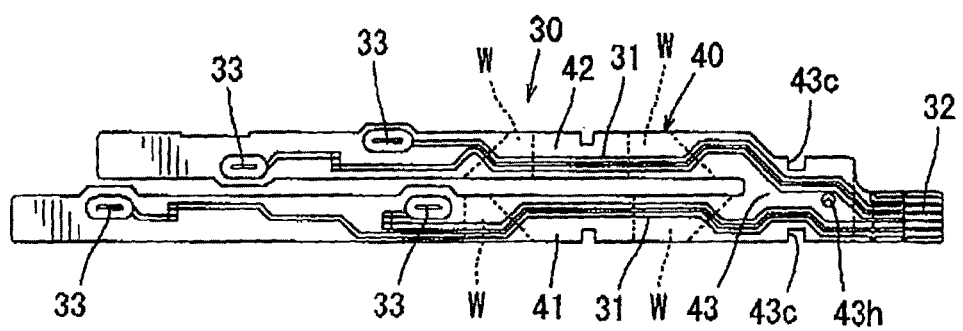

As shown in FIGS. 5(A) and 5(B), the base plate main body 40 has a straightened first band plate portion 41, a second band plate portion 42 positioned parallel to the first band plate portion 41, and a wider breadth base portion 43 connected to the base end portions of the band plate portions 41 and 42. Each of the first band plate portion 41 and the second band plate portion 42 can include a top (first) surface and a bottom (second) surface. The top and bottom surfaces can be disposed to be opposing each other and can each be a flat surface. A thickness of each of the first band plate portion 41 and the second band plate portion 42 can correspond to a distance between the top and bottom surfaces. Thus, the thickness can be measured in a thickness direction along a plane that intersects the top and bottom surfaces and that can be substantially perpendicular to a horizontal portion of the signal lines 31. The thickness direction can be a direction from the top surface to the bottom surface or a direction from the bottom surface to the top surface for each of the first band plate portion 41 and the second band plate portion 42. The base portion 43 is configured so that the leading end of the base portion 43 connects to a connector (not shown) of the electric circuit board 22. Base end portions 32 of signal lines 31 are fixed on the leading end portion of the base portion 43 so as to extend parallel to each other.

Figure 3A:
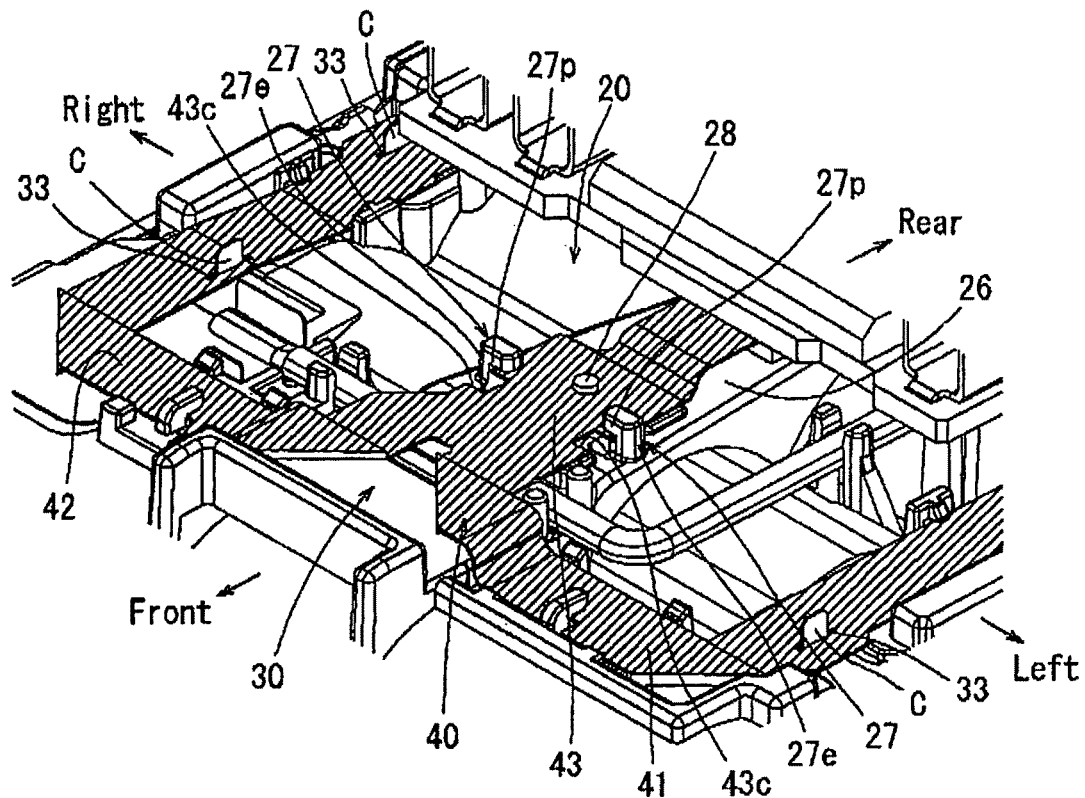
FIG. 3(A) is an enlarged perspective view of the battery pack as viewed from a direction of arrow III in FIG. 1.

As shown in FIG. 5(B), two signal lines 31 are formed to extend from the base portion 43 of the base plate main body 40 to the first band plate portion 41, and the other two signal lines 31 are formed to extend from the base portion 43 to the second band plate portion 42. Leading end portions 33 of the signal lines 31 are placed at predetermined positions on the first and the second band plate portions 41 and 42. As shown in FIG. 3(A), conductors C on the side of the rechargeable batteries Se are connected to the leading end portions 33 of the signal lines 31. The control circuit 23 of the electric circuit board 22 may serve as a control unit.

Figure 5C:
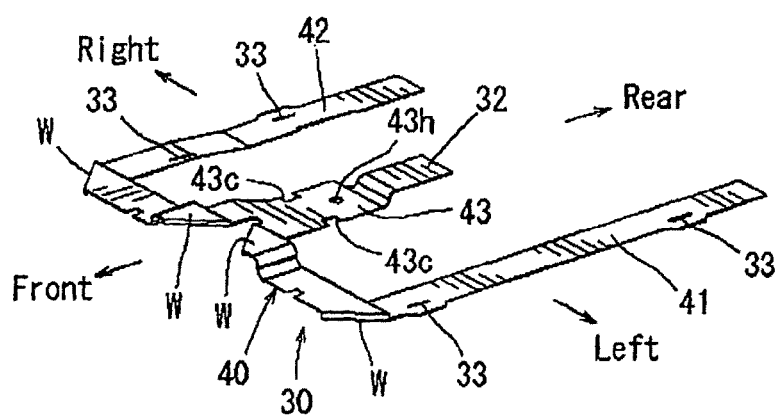
FIG. 5(C) is a perspective view of the flexible substrate after having been bent.

From the state shown in FIG. 5(B), the first band plate portion 41 of the base plate main body 40 is bent leftward at a right angle relative to the base portion 43 and further bent rearward so that the first band plate portion 41 has a substantially L shape (See FIG. 5(C)). In this way, the leading end part of the band plate portion 41 is held to be arranged parallel to the base portion 43. Also, the second band plate portion 42 is bent rightward at a right angle relative to the base portion 43 and then bent rearward so that the second band portion 42 has a substantially L shape. In this way, the leading end part of the second band plate portion 42 is held to be arranged parallel to the base portion 43. In other words, the base plate main body 40 is formed from a state shown in FIG. 5(B) into a substantially E shape in plan view as shown in FIG. 5(C).

The substrate main body 40 is made of material such as polyimide (PI). G lass epoxy (FR4) is laminated on portions of the substrate main body 40 other than bending portions W of the base plate main body 40 (See FIG. 5(A)) and the leading end of the base portion 43. Due to the above construction, the bending portions W of the base plate main body 40 may be bent at an angle of approximately 180 degrees.

Figure 3B:
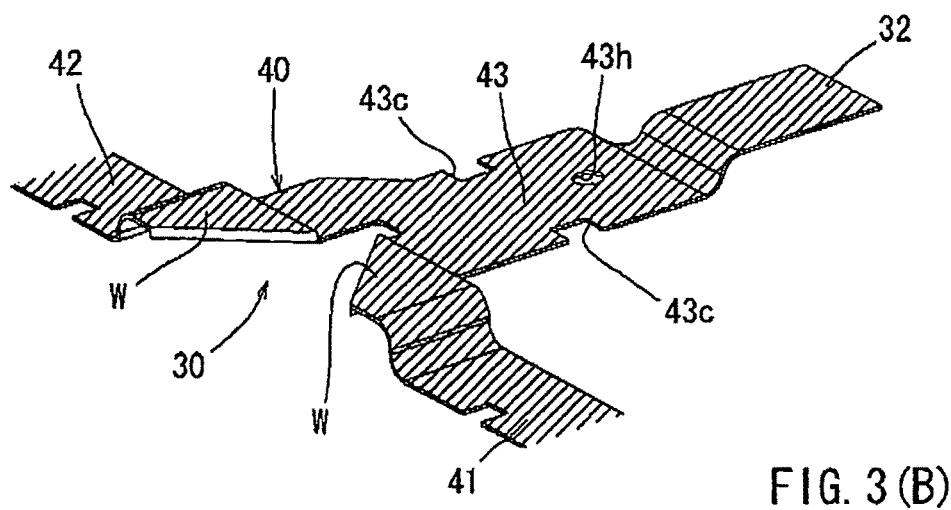
FIG. 3(B) is a perspective view showing a base portion and a portion proximal to the base portion of a flexible base plate.

As shown in FIG. 3(B), the base portion 43 of the base plate main body 40 has a through bore 43h formed therein at a central position with respect to the widthwise direction, where the glass epoxy (FR4) is laminated. On both sides with respect to the widthwise direction of the base portion 43, rectangular cut portions 43c are formed at positions spaced forwardly from the through bore 43h by a pre-determined distance.

As shown in FIG. 1 and FIG. 3(A), an E-shaped flat surface 26 is formed on; the upper surface of the internal case 20 stored in the case main body 12 of the battery pack 10. The flexible base plate 30 bent to have a substantially E-shape in plan view is placed on the E-shaped flat surface 26. A pin-like positioning protrusion 28 is formed in a projecting manner towards upward on the E-shaped flat surface 26, on which the base portion 43 of the flexible base plate 30 is placed. The positioning protrusion 28 positions the base portion 43 of the flexible base plate 30 to a pre-determined position relative to the E-shaped flat surface 26 by being inserted into the through bore 43h of the base portion 43 of the flexible base plate 30.

On the front side of the positioning protrusion 28 and on both sides with respect to the widthwise direction (the right and left directions) of the E-shaped flat surface 26, a pair of restraining protrusions 27 are formed, which restrain both end edges of the base portion 43 of the flexible base plate 30 from the right and left directions and from the upper direction. As shown in FIG. 3(A), each of the restraining protrusions 27 includes a vertical wall portion 27e and a holding portion 27p and has a substantially inverted L shape. The vertical wall portion 27e prevents displacement of the base portion 43 in the right or left direction. The holding portion 27p projects from a side surface of the vertical wall portion 27e in a direction inwardly with respect to the widthwise direction and in parallel to the E-shaped flat surface 26 and restrains the corresponding end edge of the base portion 43 from the upper side. To this end, a space for allowing insertion of the end edge of the flexible base plate 30 is defined between the E-shaped flat surface 26 and the bottom surfaces of the holding portions 27p.

The holding portions 27p of the right and the left restraining protrusions 27 are formed in a manner to align with the cut portions 43c of the central portion 43 of the flexible base plate 30. Further, a projected area of the holding portions 27p on the E-shaped flat surface 26 is set to be slightly smaller than the area of the cut portions 43c of the base portion 43.

Due to this, by positioning the right and left cut portions 43c of the base portion 43 of the flexible substrate 30 at the holding portions 27p of the restraining protrusions 27, the holding portions 27p of the restraining protrusions 27 do not interfere with the base portion 43 of the flexible base plate 30. Accordingly, under this state, it is possible to place the base portion 43 of the flexible base plate 30 on the E-shaped flat surface 26. It is also possible to easily remove the base portion 43 of the flexible base plate 30 from the E-shaped flat surface 26.

The distance from the cut portions 43c of the base portion 43 of the flexible base plate 30 to the through hole 43h in forward and rearward direction is set to be larger by a predetermined length than the distance from the holding portions 27p of the restraining protrusions 27 to the positioning protrusion 28 in the forward and rearward directions.

With the cut portions 43c of the base portion 43 of the flexible base plate 30 aligned with the holding portions 27p of the restraining protrusions 27, the base portion 43 is placed on the E-shaped flat surface 26 and is then moved to slide forwardly by a predetermined distance, so that the through hole 43h of the central portion 43 may be engaged with the positioning protrusion 28. As shown in FIG. 3(A), under this state, the end edge of the base portion 43 of the flexible base plate 30, more specifically, the rear sides of the cut portions 43c are restrained by the holding portions 27p from the upper side. In this way, the base portion 43 of the flexible base plate 30 can be prevented from being removed (floating) while being positioned at a pre-determined position.

Further, protrusions having configurations similar to the restraining protrusions 27 are formed on appropriate positions at the periphery edge of the E-shaped flat surface 26. Due to this, the end edges of the first band plate portion 41 and the second band plate portion 42 can be restrained by the protrusions from the upper side.

<Advantages of Battery Pack>

According to the battery pack 10 of the present embodiment, a plural number of signal lines 31 are formed inside the flexible base plate 30 that is a single band-like plate. Therefore, the space required for wiring can be narrowed compared to individually wiring a plural number of electrically conductive lead wires. Accordingly, it is possible to reduce the size of the battery pack.

Because the flexible base plate 30 can be bent by an angle of approximately 180 degrees, the shape of flexible base plate 30 may be freely changed. Accordingly, the freedom of positioning of the flexible base plate 30 is increased and the flexible base plate 30 can be stored utilizing open space of the case main body 12. Further, because the band-like flexible base plate 30 can be bent have a substantially E-shape in plan view, the manufacturing cost can be reduced compared to molding a base plate to have a substantially E-shape by using a mold or the like.

The flexible base plate 30 is positioned on the internal case 20 covering the upper sides of the batteries Se and can be viewed when the cover 14 is opened relative to the case main body portion 12. Therefore, the mounting operation of the flexible base plate 30 and the connecting operation of the signal line 31 can be easily performed.

When the positioning protrusion 28 of the E-shaped flat surface 26 of the internal surface 20 is engaged with the through hole 43h of the flexible base plate 30, the end edge of the flexible base plate 30 is restrained from the upper side by the holding portions 27p of the pair of right and left restraining protrusions 27. Therefore, displacement of the flexible substrate 30 and also removal (floating) of the flexible base plate 30 from the E-shaped flat surface 26 can be prevented.

Further, by sliding the flexible base plate 30 and positioning the cut portions 43c of the flexible base plate 30 to align with the holding portions 27p of the restraining protrusions 27, the flexible base plate 30 can be easily removed from the E-shaped flat surface 26.

<Possible Modifications>

The scope of the present invention may not be limited to the embodiment described above. Various changes or modifications can be made to the above embodiment within the scope of the present invention.

In the above embodiment, the flexible base plate 30 includes the first band plate portion 41, the second band plate portion 42 and the base potion 43 and is bent to have a substantially E-shape. However, the shape of the flexible base plate 30 may be appropriately changed based on the arrangement of the batteries Se and the arrangement of the electric circuit board 22.

In the above embodiment, the flexible base plate 30 includes four signal lines 31. However, the number of the signal lines may be appropriately changed.

In the above embodiment the base portion 43 of the flexible base plate 30 is restrained by using the restraining protrusions 27 of the internal case 20, the positioning protrusion 28, the cut portions 43 of the flexible base plate 30, and the through hole 43h. However, it is possible to restrain the first band plate portion 41 and/or the second band plate portion 42 by using the similar construction.

Further, in the above embodiment, the substrate main body portion 40 of the flexible base plate 30 is made of polyimide (PI) and glass epoxy (FR4). However, the material of the substrate main body portion 40 can be appropriately changed.

This invention claims:

1. A battery pack for a power tool, comprising:
a case main body configured to have an upper opening;
a cover capable of closing the upper opening of the case main body;
a plural number of rechargeable batteries stored inside the case main body;
an internal case covering upper surfaces of the rechargeable batteries;
charge and discharge terminals capable of connecting the rechargeable batteries to a power tool or a battery charger;
a control unit capable of monitoring charge and discharge states of the rechargeable batteries based on signals transmitted from the rechargeable batteries;
a plural number of signal lines capable of transmitting the signals from the rechargeable batteries to the control unit;
a single band-like flexible base plate including a base plate main body having at least one bending portion bent by an angle of about 180 degrees, the flexible base plate being positioned on the internal case, and viewable when the cover is opened;
a flat surface for placing the flexible base plate is formed on the internal case;
a positioning protrusion is formed on the flat surface; and
at least a pair of restraining protrusions being formed on opposite sides of the flat surface with respect to a widthwise direction of the flat surface, wherein
the plural number of signal lines are formed on or within the single band-like flexible base plate.

2. The battery pack as defined in claim 1, wherein:
the flexible base plate includes a first band plate portion, a second band plate portion and a base portion connected to base end portions of the first and second band plate portions,
the first band plate portion is bent at a right angle in plan view relative to the base portion and the first band plate portion is further bent to have a substantially L-shape in plan view, so that a leading end portion of the first band plate portion is held to be arranged parallel to the base portion, and
the second band plate portion is bent in a direction opposite to the first band plate portion and the second band plate portion is further bent to have substantially L-shape in plan view, so that a leading end portion of the second plate portion is held to be arranged parallel to the base portion.

3. The battery pack as defined in claim 1, wherein:
each of the restraining protrusions includes a vertical wall portion and a holding portion, the vertical wall portion restraining the flexible base plate from the widthwise direction, and the holding portion extending from the side surface of the vertical wall towards the inner side with respect to the widthwise direction of the flat surface and restraining a part of an end edge of the flexible base plate from an upper side,
the flexible base plate includes cut portions and a through-hole, the cut portions being positioned on both end edges of the flexible base plate so as to be capable of being aligned with the holding portions of the restraining protrusions, and the through-hole being capable of engaging the positioning protrusion of the flat surface, and
the through-hole and the positioning protrusion can engage with each other by positioning the cut portions of the flexible base plate to align with the holding portions of the restraining projections, placing the flexible base plate on the flat surface, and sliding the flexible base plate in a predetermined direction to cause the end edge of the flexible base plate to be restrained by the restraining protrusions from the upper side.

4. A battery pack for a power tool, comprising:
a case main body configured to have an upper opening;
a cover capable of closing the upper opening of the case main body;
a plural number of rechargeable batteries stored inside the case main body;
charge and discharge terminals capable of connecting the rechargeable batteries to a power tool or a battery charger;
a control unit capable of monitoring charge and discharge states of the rechargeable batteries based on signals transmitted from the rechargeable batteries; and
a plural number of signal lines capable of transmitting the signals from the rechargeable batteries to the control unit, wherein
the plural number of signal lines are formed on or within a single band-like flexible base plate,
the flexible base plate is positioned on an internal case covering upper surfaces of the rechargeable batteries and can be viewed when the cover is opened,
a flat surface for placing the flexible base plate is formed on the internal case, a positioning protrusion is formed on the flat surface, and at least a pair of restraining protrusions are formed on both sides of the flat surface in a widthwise direction of the flat surface,
each of the restraining protrusions includes a vertical wall portion and a holding portion, the vertical wall portion restraining the flexible base plate from the widthwise direction, and the holding portion extending from the side surface of the vertical wall towards the inner side with respect to the widthwise direction of the flat surface and restraining a part of an end edge of the flexible base plate from an upper side,
the flexible base plate includes cut portions and a through-hole, the cut portions being positioned on both end edges of the flexible base plate so as to be capable of being aligned with the holding portions of the restraining protrusions, and the through-hole being capable of engaging the positioning protrusion of the flat surface, and
the through-hole and the positioning protrusion can engage with each other by positioning the cut portions of the flexible base plate to align with the holding portions of the restraining projections, placing the flexible base plate on the flat surface, and sliding the flexible base plate in a predetermined direction to cause the end edge of the flexible base plate to be restrained by the restraining protrusions from the upper side.

5. The battery pack as defined in claim 4, wherein:
the flexible base plate includes a first band plate portion, a second band plate portion and a base portion connected to base end portions of the first and second band plate portions,
the first band plate portion is bent at a right angle in plan view relative to the base portion and the first band plate portion is further bent to have a substantially L-shape in plan view, so that a leading end portion of the first band plate portion is held to be arranged parallel to the base portion, and
the second band plate portion is bent in a direction opposite to the first band plate portion and the second band plate portion is further bent to have substantially L-shape in plan view, so that a leading end portion of the second plate portion is held to be arranged parallel to the base portion.

6. The battery pack as defined in claim 1, wherein:
the flexible base plate has a first surface and a second surface configured as flat surfaces and disposed on opposite sides with respect to a thickness direction of the flexible base plate;
the plural number of signal lines extend along the first surface; and
each of the signal lines includes a leading end portion extending across the flexible base plate in the thickness direction from a side of the first surface to a side of the second surface so as to be connected to the batteries.

7. The battery pack as defined in claim 2, wherein:
the flexible base plate has a first surface and a second surface configured as flat surfaces and disposed on opposite sides with respect to a thickness direction of the flexible base plate;
the plural number of signal lines extend along the first surface; and
each of the signal lines includes a leading end portion extending across the flexible base plate in the thickness direction from a side of the first surface to a side of the second surface so as to be connected to the batteries.

* * * * *